Sept. 13, 1966     S. MARTAUZ     3,273,117

SIGNAL LIGHTS FOR MOTOR VEHICLES

Filed Sept. 30, 1963

INVENTOR.
STANLEY MARTAUZ

W. B. Harpman
BY ATTORNEY

United States Patent Office 3,273,117
Patented Sept. 13, 1966

3,273,117
SIGNAL LIGHTS FOR MOTOR VEHICLES
Stanley Martauz, 81 Camvet Drive, Campbell, Ohio
Filed Sept. 30, 1963, Ser. No. 312,398
3 Claims. (Cl. 340—81)

This invention relates to motor vehicles and more particularly to a signaling system therefor.

The principal object of the invention is the provision of a signaling system for a motor vehicle that can be used to positively indicate the direction of turn when the vehicle is viewed from any direction.

A further object of the invention is the provision of a signaling system that is simple, efficient and easy to install on a motor vehicle.

A still further object of the invention is the provision of a signaling system for a motor vehicle in which colored signal lights are located on the motor vehicle so that the position and direction of the motor vehicle may be determined from the arrangement of said signal lights.

A still further object of the invention is the provision of a system of signal lights for a motor vehicle in which different combinations of signal lights in different locations on the motor vehicle indicate right or left turns.

This invention relates generally to directional signals and more particularly to the provision of a distinctive turn signal system for a vehicle wherein red and green colored signal lights are arranged on the vehicle so that the signal lights may be seen from all directions and thereby serve to identify the vehicle as to location, direction of travel, and turn intention when the signals are operating.

At the present time, motor vehicles are provided with turn signal indicators which provide white or amber lights on the front of the vehicle and red lights on the back and are so arranged that they are operated to indicate a turn; one of the front and one of the back lights is illuminated and controlled by a flasher. From a distance, the signal lights are visible, but it is impossible to determine which direction the vehicle is about to turn, although the front of the vehicle may be identified from the back by the different color of the lights.

In the present invention, the signal lights are so arranged as to overcome this difficulty so that the motor vehicle may be positively identified as to direction, position and turn intention no matter from what angle or from what distance it may be viewed.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
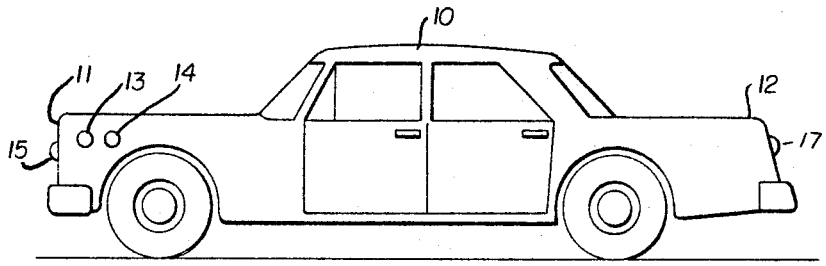
FIGURE 1 is a side view of a motor vehicle illustrating the signaling system installed thereon.
Figure 2:
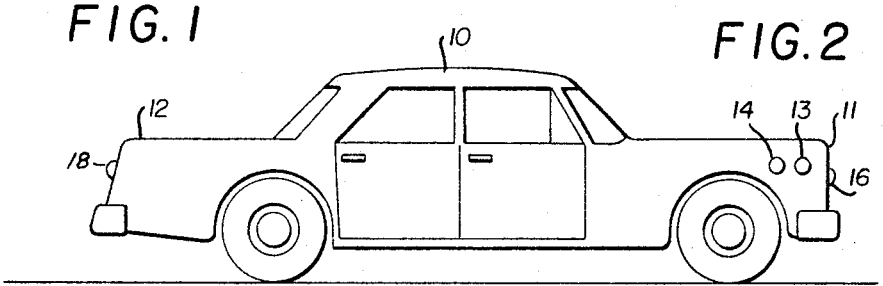
FIGURE 2 is a side view of the opposite side of the motor vehicle illustrated in FIGURE 1.

By referring to the drawings and FIGURES 1 and 2 in particular, it will be seen that a motor vehicle is illustrated in FIGURE 1 as driving toward the left and in FIGURE 2 as driving toward the right. In FIGURES 1 and 2, the motor vehicle is generally indicated by the numeral 10 with the front end indicated by the numeral 11 and the rear of the vehicle indicated by the numeral 12. A signaling system comprising a plurality of colored lights is disposed on the motor vehicle, and by referring to FIGURES 1, 2, 3 and 4 of the drawings, it will be seen that there are two pairs of signal lights 13 and 14 and 13A and 14A, one pair on each side of the motor vehicle 10 adjacent the front end 11 thereof, the signal lights 13 and 13A being red signal lights and the signal lights 14 and 14A being green signal lights. The front end 11 of the motor vehicle 10 has a pair of signal lights thereon as best seen in FIGURES 3 and 4 of the drawings, the one on the left side of the front indicated by the numeral 15 being a red signal light, and the one on the right side of the front indicated by the numeral 16 being a green signal light.

The rear of the motor vehicle 10 is provided with a pair of signal lights, the one on the left rear side indicated by the numeral 17 being a red signal light and the one on the right rear side indicated by the numeral 18 being a green signal light. Those skilled in the art will observe that in addition to the signal lights just described, the motor vehicle is provided with the customary tail lights and back-up lights on its rear portion and head lights on its front end.

Figure 3:
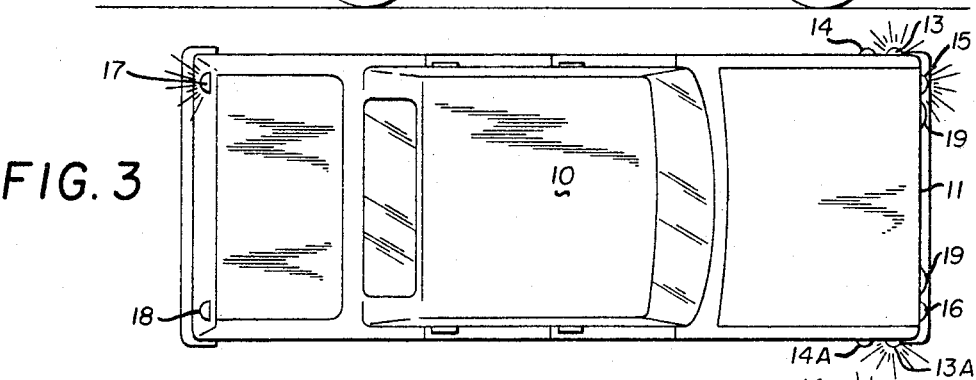
FIGURE 3 is a top plan view of the motor vehicle seen in FIGURES 1 and 2 with lines indicating the illumination of certain of the signal lights thereon.
Figure 4:
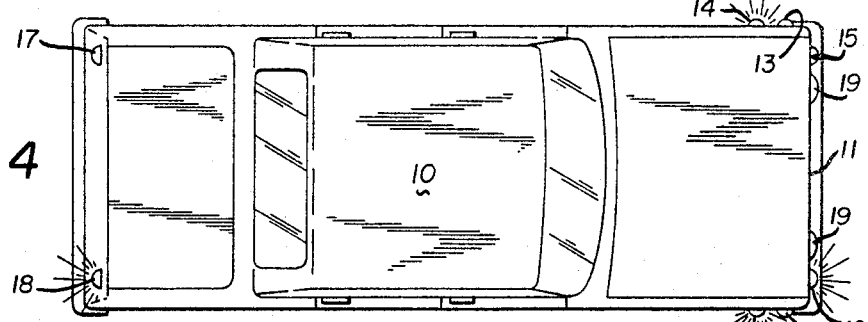
FIGURE 4 is a top plan view of the motor vehicle seen in FIGURES 1 and 2 with lines indicating the illumination of others of the signal lights thereon.

In FIGURES 3 and 4 of the drawings, the head lights are indicated by the numeral 19 and the tail lights and back-up lights may be combined with the turn signal lights 17 and 18, or, if desired, they may comprise separate units.

Figure 5:
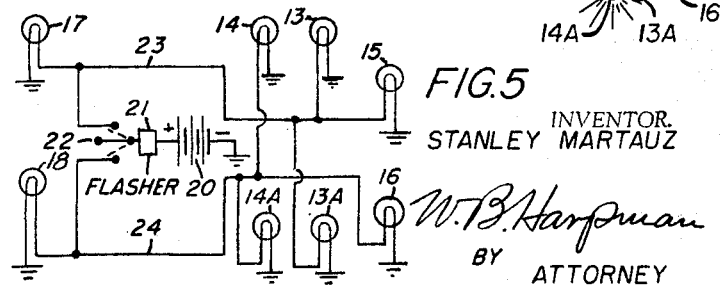
FIGURE 5 is a symbolic wiring diagram illustrating an energizing circuit for the signal lights.

By referring now to FIGURE 3 of the drawings, radial lines radiating from the signal lights 17, 13, 15 and 13A indicate that these red signal lights as heretofore described have been illuminated by a suitable energizing circuit such as illustrated in FIGURE 5 of the drawings. It will be seen that the front of the vehicle displays the red signal light 15, while the right front side of the vehicle displays the red signal light 13, the lights being in close proximity to one another. The right side of the vehicle displays the red signal light 13A and the left side of the rear of the vehicle displays the red signal light 17. According to a preferred system, the showing of the several red signal lights, as seen in FIGURE 3 and hereinbefore described, indicates a lefthand turn, as, for example, when the vehicle is approaching an intersection of a main street and it is intended that the vehicle will turn left into said main street. Drivers of other vehicles, as well as pedestrians, can readily observe the red signal lights thereby positively indicating a left turn, and furthermore, drivers of vehicles some distance away on the street the vehicle is on, or on the main street, can determine the direction in which the vehicle is moving from the red signals, as well as the direction of intended turn, and, more importantly, the position of the vehicle can be determined from the arrangement and grouping of the red signals thus displayed.

By referring now to FIGURE 4 of the drawings, a different set of signal lights is shown illuminated by radially extending lines which in FIGURE 4 extend from the green signal lights 14, 16, 14A and 18. These green signal lights indicate that the vehicle is about to make, or is making, a right turn and the same remarks as hereinbefore applied to the ability of others to determine the position of the vehicle, the direction of travel and the direction of turn being made apply equally well with respect to the right turn being signaled. For example, the driver of another vehicle seeing the two green signal lights 14A and 16 in close proximity to one another recognizes that he is seeing the front righthand corner of the vehicle and that it is signaling a right turn. The invention enables him to properly locate the vehicle relative to the street or the corner of the intersection, as the case may be, even though he may not be able to see the vehicle itself through the darkness. Thus, the signaling system disclosed herein provides several advantages that are not found in other signaling systems such as those now known in the art.

Those skilled in the art will understand that the particular signaling system disclosed herein can be applied to vehicles other than passenger vehicles as herein illustrated, for example, bicycles and motorcycles, may be so equipped and it may be desirable to combine the signals in units having different colored sections capable of providing the hereinbefore described red and green signals indicating left and right turns respectively from whichever direction the bicycle or motorcycle may be viewed.

By referring now to FIGURE 5 of the drawings, a symbolic diagram of an energizing circuit for the signal lights disclosed herein may be seen. In FIGURE 5 a battery 20 is indicated in a circuit, including a flasher 21 and a selective switch 22. The switch 22 is arranged to selectively energize circuits 23 and 24 respectively. The circuit 23 extends to the red signal lights 17, 13, 15 and 13A. The circuit 24 extends to the green signal lights 14, 16, 14A and 18.

It will thus be seen that a system of signal lights for motor vehicles has been disclosed which meets the several objects of the invention, and having thus described my invention, what I claim is:

1. A signal light system for a motor vehicle and including spaced red and green signal lights, each respectively on the left and right sides of the rear of the vehicle, and spaced red and green signal lights on the left and right of the front of the vehicle and a pair of spaced red and green signal lights on each side of the vehicle adjacent the front thereof, an energizing circuit for selectively illuminating either said red signal lights or said green signal lights to respectively indicate a turn to the left or to the right, said red and green signal lights being individually positioned and horizontally spaced.

2. The system of signal lights for a motor vehicle as set forth in claim 1 and wherein the red signal lights on the front and rear of the vehicle are positioned adjacent the left side thereof and wherein the green signal lights on the front and rear of the vehicle are positioned adjacent the right side thereof.

3. The system of signal lights for a motor vehicle as set forth in claim 1 and wherein the red signal lights on the front and one side of said vehicle are adjacent one another and the green signal lights on the front and the other side of the vehicle are positioned one on either side of one of said red signal lights.

References Cited by the Examiner

UNITED STATES PATENTS

| | | | |
|---|---|---|---|
| 2,057,760 | 10/1936 | Binder | 340—87 |
| 2,179,889 | 11/1939 | Hall | 340—87 |
| 2,275,260 | 3/1942 | Kalisz | 340—146 |
| 2,342,349 | 2/1944 | Kalisz | 340—146 |

NEIL C. READ, *Primary Examiner.*

A. H. WARING, *Assistant Examiner.*